3,028,403
HALOGENATING ORGANIC MATERIALS

Earle Fritz, East Chicago, Ind., and Marcus H. Bornfleth, Lansing, and Jack M. Becktel, Chicago, Ill., assignors to Swift & Company, Chicago, Ill., a corporation of Illinois
No Drawing. Filed Mar. 17, 1958, Ser. No. 721,654
6 Claims. (Cl. 260—408)

This invention relates to an improved process for halogenating organic materials and more particularly to an improved method for adding halogens to organic compositions containing ethylenic unsaturation.

Organic compositions containing ethylenic unsaturation may advantageously be reacted with halogens such as bromine to add bromine atoms to the points of unsaturation in said composition. The addition of bromine to these unsaturated compositions results in a marked increase in the specific gravity thereof, the amount of the increase being determined by the degree of unsaturation of the material undergoing bromination. High specific gravity compositions such as brominated vegetable oils may be used as weighting agents for citrus flavored soft drinks, and other compositions brominated in accordance with this invention may be used as intermediates in chemical synthesis.

The classical method of brominating organic compositions requires that the bromination reaction be carried out at a low temperature. Likewise in other prior art processes low reaction temperatures in the range around −10 to 15° C. are coupled with the use of solvents such as carbon tetrachloride, carbon disulfide, etc. Because of the requirement that these reactions be carried out at low temperatures, cooling is essential in the reaction and therefore adequate cooling equipment must be provided. Also the use of toxic solvents such as carbon tetrachloride or explosive solvents such as carbon disulfide presents a hazard to employes working in plants where such solvents are used. Furthermore, since these solvents must after the reaction is completed be separated from the reaction product, distillation equipment is also required. Finally, it should be possible to isolate a reasonably pure brominated product, and this is not always possible where solvents having a characteristic odor or low vapor pressure are employed in the bromination process.

It is therefore an object of this invention to provide an improved bromination process which substantially avoids the disadvantages aforementioned.

Another object is the provision of an improved method for brominating organic materials wherein the brominated product is easily separated from traces of free bromine.

A further object of the invention is to provide brominated fatty materials having a high specific gravity and a minimum amount of free bromine.

Additional objects, if not specifically set forth herein, will be readily apparent from the detailed description which follows:

Generally this invention comprises an improved method for adding bromine to an organic material containing ethylenic unsaturation in a two-phase reaction system. The material being brominated may be suspended in a liquid bromine solvent which is a nonsolvent for said material or a nonsolvent for the brominated product, and bromine added to the suspension dropwise. Because the bromine is present in solution and the material being brominated or the brominated product is not soluble in the bromine solvent, the reaction may and preferably is carried out at a temperature substantially higher than has been suggested in the prior art. This factor allows for a reduction in the amount of cooling necessary along with the expense thereof. In addition, a very efficient bromination is achieved at the higher temperatures.

A particularly desirable bromine solvent in which many of the unsaturated organic materials, which are advantageously treated by this method, are insoluble is methanol. Liquid bromine has an appreciable solubility in methanol, while unsaturated fatty materials which represent the preferred unsaturated organic compositions of this invention have little solubility in methanol. Contact of the bromine solution with the composition undergoing bromination is aided considerably by vigorous agitation of the two-phase mixture and, as the bromine adds to the points of unsaturation of the unsaturated material, the bromine solution becomes less concentrated and the organic material undergoes a significant increase in specific gravity.

Unsaturated organic compositions which may advantageously be treated in accordance with the method of this invention include generally esters of long chain unsaturated fatty acids with mono, di, and polyhydric alcohols, fatty alcohols, ketones, amides, nitriles, and sulfonated fats as well as unsaturated hydrocarbons. The process is particularly useful in the treatment of glycerides such as animal, vegetable, and marine fats and oils. Glyceride oils containing fatty acid radicals having unsaturated bonds are particularly desirable as materials to be brominated. In the fatty acid radical portion of such glyceride molecules the ethylenic unsaturation is present as one or more pairs of unsaturated bonds. In an oleic radical there is one unsaturated bond, while in a linoleic radical there are two unsaturated groups, and three or more unsaturated groups may be found in the fatty acid radicals derived from linolenic acid or eleostearic acid. Thus esters of monoethenoid, diethenoid, and triethenoid acids, and mixtures thereof are deemed to be within the scope of the invention. Examples of naturally occurring compositions which may be treated in accordance with this method are cottonseed oil, soybean oil, lard oil, olive oil, corn oil, sesame oil, safflower seed oil, apricot kernel oil, grease, herring oil, and palm oil. Fatty acid esters of glycols and fatty acid esters of monohydric alcohols such as methyl, ethyl, propyl, and butyl oleate may also be brominated by this method.

As has been noted previously, the various reactants may be added to the reaction vessel in various ways. The organic material being brominated may be suspended in methanol and the bromine added dropwise or the bromine may be added beneath the surface of the organic material in the methanol solvent. In any case the mixture must be vigorously agitated and when the reaction is complete there is a clean separation between the methanol solvent containing the bromine and the brominated organic material. This sharp separation of phases permits removal of unreacted bromine and methanol by top suction or decantation or separation in a separatory funnel. During the reaction the temperature increases with addition of the bromine. The reaction should be controlled so that the temperature is maintained between 0 and 50° C. If the reaction is conducted at a temperature within this range, a product having a maximum specific gravity for the amount of unsaturation present therein before treatment is obtainable. The product will also be satisfactory with respect to color since a dark objectionable color develops only as the reaction temperature is permitted to rise above about 50° C. An excess of about 5 percent of the bromine is usually employed to insure completion of the bromination reaction. The amount of excess employed is not critical and is affected to some extent by the time of reaction, i.e., if the reaction is run for an inordinately long time, little or no excess bromine will be required. The excess usually employed does not exceed about 5 percent based on the weight of the material being brominated.

The following examples, which are designed to illustrate and should not be construed as limitative of the invention, show the bromination of glyceride esters.

*Example I*

Cottonseed oil (800 grams) having an I.V. of 115 was mixed with 400 ml. methanol. The mixture was cooled below 38° C. and stirred vigorously to form a dispersion of the vegetable oil in the methanol. To this cooled stirred mixture 576 grams of bromine was added in a dropwise manner. As the bromine is added to the methanol dispersion of cottonseed oil, the temperature rises. During the course of the reaction the temperature was maintained below about 50° C. by cooling when necessary. The bromine was added at the rate of about 5 grams per minute and the reaction was substantially completed in about 2½ hours, although the mixture was stirred vigorously for an additional ½ hour to insure completion of the reaction at the end of this time. Stirring was terminated and the methanol-bromine solution which formed the top layer in a two-phase system was removed by top suction. The remaining brominated oil was washed five times with 100 milliliter portions of methanol. This washing step may be a countercurrent operation. In each case the methanol wash was removed by top suction. The resultant brominated oil having a specific gravity of 1.32 was dried by sparging air through the oil while the oil is maintained under vacuum conditions. After all methanol has been removed the air sparge is shut off and vacuum is employed to remove the last traces of methanol and dissolved air. The cottonseed oil which had an I.V. of 115 before the reaction had an I.V. of 0.5 after the bromination procedure. The color of the oil was pale yellow and there was no detectable odor of free bromine in the brominated product.

*Example II*

A solution of 375 grams of bromine in 300 ml. methanol was placed in a reaction vessel equipped with a mechanical stirrer. About 500 grams of cottonseed oil was added dropwise to the stirred solution. As the vegetable oil was added to the bromine solution the temperature of the mixture, which was vigorously agitated, rose. During the course of the reaction the reaction temperature was not permitted to rise above about 50° C. The reaction was completed in about 1 hour. After an additional ½ hour reaction time, the stirring was stopped and the mixture separated into two phases, the upper phase consisting of unreacted bromine in methanol and the lower phase consisting of brominated cottonseed oil and any impurities present in the oil. The top layer was removed with top suction and the lower brominated oil layer was washed five times with 300 milliliter portions of methanol. A convenient method of washing the reaction mixture is by passing the methanol wash countercurrently to the reaction mixture. A more rapid and efficient washing operation is achieved in this manner. The washed reaction product was then sparged with air under vacuum to remove the major portion of residual methanol and vacuum was employed to remove the last traces of methanol and dissolved air. The resultant product had an I.V. of 0.5 whereas the starting cottonseed oil had an I.V. of 114. The specific gravity of the light colored oil was 1.325. Similarly oleic acid, glycerol trioleate, and methyl esters of mixed fatty acids were brominated in this fashion.

As has been noted previously, the reaction may be carried out at temperatures varying between 0 and 50° C., although a temperature within the range 30–40° C. is generally preferred. The presence of the methanol solvent in the reaction mixture serves to inhibit undue temperature rises, although, of course, the temperature rises to some extent as the bromine is added to the vegetable oil. If the rate of addition of bromine is too fast, the temperature may rise rapidly in which case some cooling may be necessary.

Although in its preferred form the invention involves a nonhomogeneous system, i.e., the material undergoing bromination is not miscible with methanol whereas bromine is quite soluble, it is also possible to brominate materials which are soluble in methanol, provided the brominated reaction product is substantially insoluble.

Obviously many modifications and variations of the invention as hereinbefore set forth may be made without departing from the spirit and scope thereof and therefore only such limitations should be imposed as are indicated in the appended claims.

We claim:

1. An improved bromination process comprising reacting bromine admixed with methanol as a bromine solvent with an aliphatic ethylenically unsaturated organic material which is substantially immiscible with said bromine solvent at a temperature below about 50° C. while vigorously agitating the reaction mixture for a time sufficient to substantially add bromine to the points of unsaturation in said unsaturated material.

2. An improved method for brominating aliphatic organic materials containing ethylenic unsaturation comprising dissolving bromine in methanol as a bromine solvent which is substantially immiscible with said organic material; adding to said bromine solution with vigorous agitation said organic material to cause addition of bromine to the points of unsaturation of said organic material and subsequently removing said solvent from said brominated material.

3. An improved method for brominating esters of aliphatic ethylenically unsaturated fatty acids comprising dissolving bromine in methanol as a bromine; adding said bromine solution to said fatty esters to form two immiscible phases, the upper phase consisting of a less dense bromine solution and the lower phase consisting of said fatty acid ester; vigorously agitating the two-phase mixture and heating to around 30–40° C. to effect addition of bromine at the points of unsaturation in said ester and subsequently removing the lighter bromine-solvent phase from the brominated fatty acid ester.

4. An improved method for brominating vegetable oils containing aliphatic ethylenic unsaturation comprising admixing said vegetable oil with methanol to form a dispersion of said vegetable oil in said methanol, adding bromine to said mixture and agitating said mixture while maintaining the temperature of the reaction mixture below about 50° C. for a time sufficient to insure addition of said bromine to the unsaturated portions of said vegetable oil.

5. An improved continuous method for brominating an aliphatic ethylenically unsaturated organic material which comprises dissolving bromine in methanol; passing said bromine solution into a reaction zone in countercurrent fashion to said ethylenically unsaturated organic material which is passed into said reaction zone; contacting said bromine solution with said ethylenically unsaturated organic material in said reaction zone for a short time to form a bottoms phase rich in brominated organic material and an overhead phase rich in unreacted bromine dissolved in said solvent and separating said bottoms phase and said overhead phase.

6. An improved method for brominating vegetable oils containing aliphatic ethylenic unsaturation comprising admixing said vegetable oil with methanol, adding an excess of bromine to said mixture and agitating said mixture while maintaining the temperature of the reaction mixture below about 50° C. for a time sufficient to insure addition of said bromine to the unsaturated portions of said vegetable oil, separating said brominated oil from said methanol and unreacted bromine and subjecting said brominated product to a countercurrent water washing step.

References Cited in the file of this patent

UNITED STATES PATENTS 1,932,590    Kaselitz    Oct. 31, 1933

FOREIGN PATENTS 233,857    Germany    Apr. 24, 1911
583,369    Great Britain    Dec. 17, 1946

OTHER REFERENCES

Petrov. Zhur. Obschei Khim. 23, 1866–9 (1953), cited in Chem. Abst. 49 829a (1955).

Blatt: Organic Syntheses, Collective vol. 2, 1943 edition, 1955 printing, p. 177, Call No. QD 262 0 72.C2. (Copy in Div. 38.) John Wiley and Sons, New York, N.Y.

Groggins: Unit Processes in Organic Synthesis, p. 207 (1958, fifth edition), McGraw-Hill, New York, N.Y. (Copy in Div. 38.) Call No. 262 G7 1958 C.2.

UNITED STATES PATENT OFFICE
CERTIFICATE OF CORRECTION

Patent No. 3,028,403                          April 3, 1962

Earle Fritz et al.

It is hereby certified that error appears in the above numbered patent requiring correction and that the said Letters Patent should read as corrected below.

Column 4, line 36, after "bromine", second occurrence, insert -- solvent --.

Signed and sealed this 11th day of September 1962.

(SEAL)
Attest:

ERNEST W. SWIDER                      DAVID L. LADD
Attesting Officer                        Commissioner of Patents